UNITED STATES PATENT OFFICE.

AUGUSTE J. ROSSI, OF NEW YORK, ASSIGNOR OF ONE-HALF TO JAMES MacNAUGHTON, OF ALBANY, NEW YORK.

PROCESS OF REDUCING ORES.

SPECIFICATION forming part of Letters Patent No. 486,941, dated November 29, 1892.

Application filed April 16, 1892. Serial No. 429,467. (No specimens.)

*To all whom it may concern:*

Be it known that I, AUGUSTE J. ROSSI, a citizen of the United States, residing in the city, county, and State of New York, have invented certain new and useful improvements in methods and processes of reducing ores designated as "titaniferous-iron ores," being ores which contain an important amount—say not less than four per centum, or thereabout—of titanic acid, of which the following is a description.

Notwithstanding that the great extent and accessibility of titaniferous ores and the superior qualities of the iron produced therefrom have long been well known, previous attempts to produce iron therefrom commercially have proved abortive, because of the increased expense of reducing and fluxing these ores as compared to others. This prohibitory increment was due to the fact, among others, that heretofore the addition of silica as an extra and special flux has been deemed indispensable to obtain a fusible slag. Accordingly, for instance, in previous attempts to flux titaniferous ores large quantities of quartz were charged into the furnace in addition to limestone as fluxes, the result being a slag of substantially such composition as to reproduce sphene or titanite, which, as is well known, is composed of about equal parts of silica, titanic acid, and lime, the proportion of silica to titanic acid reaching occasionally as much as one to one and one-third, the lime being reduced in proportion in such cases. The amount of silica thus incorporated into the slag was about equal to the titanic acid therein, and was in sufficient amount to produce a silicate which of itself was fusible independently of any titanic acid present, the latter being "treated," so to speak, as inert matter. Thus the metallurgical treatment and reduction of these titaniferous ores has heretofore involved the addition of special fluxes, besides those regularly used with other ores free from titanic acid, and the addition of such special fluxes has been deemed indispensable to obtain from titaniferous ores a sufficiently fusible slag. These special fluxes added to the cost of treating titaniferous ores not only the direct item of the expense of obtaining and handling the same, but also indirectly a considerable item of expense due to the extra burden thereby imposed upon the furnace, since they unduly increased the amount of materials to slag, whereby the amount of fuel was increased and also the productive capacity of the furnace diminished.

The object of my invention is to provide a method or process of fluxing or treating titaniferous ores which, without impairing the quality of the iron product, shall be as simple and economical as other processes available for fluxing ores that are not titaniferous. To this end I relegate to an entirely-subordinate position the silica heretofore supposed to be indispensable, and in lieu thereof substitute as the essential element in the formation of the slag the heretofore supposed objectionable titanic acid, and I rely upon the latter as the essential and predominant factor to slag the basic materials derived from the ores, fuel, and fluxes added. Thus primarily, and as one of the distinctive features of my invention and improved method and process, I dispense wholly with the necessity of adding quartz as a flux, as silica becomes in my process a mere accessory and comparatively-unimportant element in the slag, and its presence there may be treated as unimportant and fortuitous, its amount compared to that of the titanic acid being always but a mere fraction thereof, and in many cases is reduced to almost nothing at all.

Many of the natural compounds of titanium—such as picrotanite and perofkite—are known to be infusible. All those which, besides sphene, are fusible embody silica in the ratio thereof to titanic acid of substantially 1.1 or even more, and the attempt to reproduce these fusible compounds in the slag would consequently involve, as aforesaid, the addition of silica in fluxing, without mentioning the presence in these compounds of other elements, either rare or unavailable in an economical blast-furnace practice.

Broadly stated, my invention consists in so fluxing without the intentional addition of silica as a flux that the titanic acid itself will act substantially the same part as the silica has heretofore been employed to do in regard to the bases of the limestone, ashes of fuel, and gangues of ores—viz., alumina, lime, and magnesia, or such other bases as may occur—and so that the titanic acid will form with them fusible compounds predominating over all others in the slag, and thereby I am enabled to dispense with any special or other fluxes than those used ordinarily in blast-furnace practice with ore free from titanic acid, and so that the presence of no certain specific amount of silica in compound or slag containing such titanic acid, alumina, magnesia, and lime, or other bases is necessarily or usefully required to effect or insure their fusibility, and therefore should silica be found in any considerable amount (but always as a fraction of the titanic acid) in my slags its presence there must be considered fortuitous and as an unavoidable incident resulting from the composition of the ashes of fuel, limestone, and gangue of ore.

As the construction and method of operation of an ordinary blast-furnace, as well as the treatment of the fuel, ores, and fluxes therein, are all well understood, I do not deem it necessary to go into any description of these. In employing my process I make use of all these in the usual way; but to the titaniferous ore I add in the same way in which fluxes are usually added sufficient limestone or other equivalent material to furnish to the titanic acid, in addition to what is provided by the ashes of the fuel, enough bases—such as lime, alumina, and magnesia—or sufficient of any two of them, particularly of alumina and lime, to insure the predominance in the slag of multiple-titanates of these bases. The respective quantities of alumina, lime, and magnesia may vary for the same quantity of titanic acid present in a slag; but I have obtained the best results when the ratio of the oxygen of the acid elements of the slag (the titanic acid and whatever silica, limestone or equivalent material, ashes of fuel, and gangue of ore may be introduced) to the oxygen of all the bases present is kept within, say, substantially the proportion of from two to one and one-half (2:1½) to two to two (2:2.) Such oxygen ratio would correspond to a proportion of, say, forty-five per cent. to fifty-five per cent. of total acid elements to fifty-five per cent. to forty-five per cent. of total basic elements.

As will be understood by metallurgists, it is impossible to prescribe any absolute rule or ratio of proportion for the various elements introduced into charges in carrying out my process. Such proportions will necessarily vary in each case, according to the special conditions presented by the different ores and stones which may be employed. To illustrate, however, with greater definiteness the principles involved in my improvements, I give the following tabulated statement, showing what I find to be useful proportions for the various elements entering into the composition of a charge divided for the purpose of computation into two hundred parts, of which one hundred are ore, thirty stone, and seventy fuel, as follows, viz:

Composition.
100 pounds ore:
Silica ............ 1.50%
Titanic acid.... 20.00%
Lime ............ 1.50%
Magnesia ....... 1.00%
Alumina ........ 5.00%
                  ——— 29.00% gangue = 29 lbs.
Oxide of iron... 71.00% 71.00% oxide of iron
                  ———
                  100.00

Composition.
30 pounds New Jersey Dolomitic stone:
Silica............ 4.00%
Lime ............ 31.00%
Magnesia ....... 19.00%
Alumina ........ 1.00%
                  ——— 55.00% = 16.50 lbs.
Carbonic acid........ 45.00%
Losses, &c. .............
                  ———
                  100.00

Composition of ashes.
70 pounds Lehigh Anthracite 7% ashes = 4.90 lbs. ashes:
Silica............ 2.80 lbs.
Alumina ...... 2.10 lbs.

The slag derived from the foregoing charge should prove of substantially the composition indicated by the following table, viz:

*Materials going into slag as furn'shed by—*

|  | Ore. | Stone. | Fuel. | Total lbs. materials in slag. | Per cent. compositions of slag. |
|---|---|---|---|---|---|
|  | lbs. | lbs. | lbs. | lbs. |  |
| Silica......... | 1.50 | 1.20 | 2.80 | 5.50 | 10 91 |
| Titanic acid.. | 20.00 |  |  | 20.00 | 39 67 |
| Lime......... | 1.50 | 9.30 |  | 10.80 | 21.42 |
| Magnesia .... | 1.00 | 5 70 |  | 6.70 | 13.29 |
| Alumina .... | 5.00 | 0.30 | 2 10 | 7.40 | 14 63 |
|  | 29.00 | 16.50 | 4.90 | 50.40 | 99.97 |

It will of course be understood that the foregoing tables are not intended to limit my invention or the claims of this patent to any specific combinations of elements as therein set forth, but are introduced for illustration merely, and to assist in an understanding of what has been here said respecting different ratios and proportions of various elements and resulting combinations made use of in my process.

In making use of my process I do not find it always necessary to use all three of the bases mentioned in the same slag. For instance, I am able to produce a good, fusible, and liquid slag by the use of two of said bases—more especially so with alumina and lime—the proportions of which to each other and to the other elements of the charge will depend upon the special circumstances of each case and will readily be determined by those skilled in the art. I may say generally that I find that the best results are obtained in using this diminished number of said basic elements when the oxygen ratio of the acid and basic elements of the slag are kept within the same limits and relative proportions as when three earthy bases are used, as above described. The composition of the furnace charges having thus been regulated so that the titanic acid is provided with the basic elements—alumina, lime, and magnesia, or any two of them, substantially as mentioned—and so as to result in the formation of predominant titanates of said bases, the usual treatment of a blast-furnace is applied and the iron and slags separated in the usual manner.

In the foregoing description of the different bases which go to form the slags I have not deemed it important to mention specifically the small quantities of ferrous or manganous oxides or alkalis usually found in these compounds, because as far as iron oxide is concerned it is the object of the blast-furnace process to reduce this iron in a slag to a minimum, and this irrespective of the question whether the ores contain titanic acid or not, and the amount of such oxides present is too small generally when the furnace is in normal working order to effect materially unless it be to increase the fusibility of the slag or its oxygen ratio.

I find it preferable in some cases to so regulate the constituents of the charge as to incorporate therein as an element either of the fixed alkalies potash or soda, or both, the amount of which may be regulated according to the total percentage of silica furnished jointly by the various substances going to make up the charge—that is to say, in the case of a substantially-inappreciable amount of silica—say one per cent.—three or four per cent. of such alkalies, or more, might be used with beneficial effect, though in all cases the presence of such alkalies will facilitate the fusibility of my slag and increase the fluidity. The desired alkali may be incorporated into the charge in the shape of natural alkali-bearing rock—such as feldspar—or in the shape of common salt or wood-ashes, such rock-salt or ashes taking the place of so much equivalent limestone, thus not increasing the burden of the furnace.

What I claim as new, and desire to secure by Letters Patent, is—

1. The process of fluxing titaniferous iron ores, which consists in combining their titanic acid with bases as fluxes, so as to form in the slag predominant titanates of two or more of those bases and subjecting the combination to the usual heat and treatment of a blast-furnace, substantially as and for the purpose described.

2. The process of fluxing titaniferous iron ores, which consists in combining their titanic acid with bases and fixed alkalies as fluxes, so as to form in the slag predominant titanates of those bases and subjecting the combination to the usual heat and treatment of a blast-furnace, substantially as and for the purpose described.

3. The process of fluxing titaniferous iron ores, which consists in combining their titanic acid with earthy bases as fluxes, so as to form in the slag predominant titanates of two or more of those bases and without a sufficient amount of silica to flux said bases, and subjecting the combination to the usual heat and treatment of a blast-furnace, substantially as and for the purpose described.

4. The process of fluxing titaniferous iron ores, which consists in combining their titanic acid with earthy bases and fixed alkalies as fluxes, so as to form in the slag predominant titanates of those bases, and without a sufficient amount of silica to flux said bases, and subjecting the combination to the usual heat and treatment of a blast-furnace, substantially as and for the purpose described.

5. The process of fluxing titaniferous ores, consisting in combining them in and subjecting them to the usual treatment and fusion of a blast-furnace, in combination with fuel, the earthy bases, alumina, lime, and magnesia, and without a sufficient amount of silica to flux said bases, substantially as and for the purpose described.

6. The process of fluxing titaniferous ores, consisting in combining them in and subjecting them to the usual treatment and fusion of a blast-furnace, in combination with fuel, the earthy bases, alumina and lime, and without a sufficient amount of silica to flux said bases, substantially as and for the purpose described.

AUGUSTE J. ROSSI.

Witnesses:
WM. COTTER DICK,
HENRY CHAS. SCHWARZ.

Corrections in Letters Patent No. 486,941.

It is hereby certified that in Letters Patent No. 486,941, granted November 29, 1892, upon the application of Auguste J. Rossi, of New York, N. Y., for an improvement in "Processes of Reducing Ores," errors appear in the printed specification requiring correction as follows: In line 89, page 1, the period between the numerals "1" and "1" should be stricken out and the proportion mark (:) inserted instead; and in line 37, page 3, the hyphen between the words "rock" and "salt" should be stricken out and a *comma* inserted instead; and that said Letters Patent should be read with these corrections therein that the same may conform to the record of the case in the Patent Office.

Signed, countersigned, and sealed this 24th day of January, A. D. 1893.

[SEAL.]

CYRUS BUSSEY,
*Assistant Secretary of the Interior.*

Countersigned:
W. E. SIMONDS,
*Commissioner of Patents.*